United States Patent [19]

Krupinski et al.

[11] Patent Number: 5,691,445

[45] Date of Patent: Nov. 25, 1997

[54] DEVOLATILIZATION

[75] Inventors: Steven M. Krupinski, West Boylston, Mass.; James T. McQueen, Jaffrey, N.H.

[73] Assignee: Novacor Chemicals (International) S.A., Villars-Sur-Glane, Switzerland

[21] Appl. No.: 623,228

[22] Filed: Mar. 28, 1996

[51] Int. Cl.$^6$ ........................................ C08F 6/00
[52] U.S. Cl. .................. 528/483; 528/481; 528/483; 528/492; 528/497; 528/498; 528/502
[58] Field of Search ................... 528/481, 483, 528/492, 497, 498, 503

[56] References Cited

U.S. PATENT DOCUMENTS

| | | | |
|---|---|---|---|
| 3,658,946 | 4/1972 | Bronstert et al. | 260/878 R |
| 3,660,535 | 5/1972 | Finch et al. | 260/880 |
| 3,773,740 | 11/1973 | Szabo | 260/93.5 A |
| 3,903,202 | 9/1975 | Carter et al. | 260/880 |
| 4,195,169 | 3/1980 | Priddy | 528/500 |
| 4,934,433 | 6/1990 | Aboul-Nasr | 156/43.1 |
| 5,069,750 | 12/1991 | Aboul-Nasr | 159/2.001 |
| 5,102,591 | 4/1992 | Hasson et al. | 264/45.9 |
| 5,118,388 | 6/1992 | Aboul-Nasr | 159/2.1 |
| 5,145,728 | 9/1992 | Itaba et al. | 428/213 |
| 5,380,822 | 1/1995 | Skilbeck | 528/499 |

*Primary Examiner*—Samuel A. Acquah
*Attorney, Agent, or Firm*—Kenneth H. Johnson

[57] ABSTRACT

A polymer melt may be devolatilized to less than 500, preferably less than 150 ppm of residual volatile material by injecting into the melt an amount of a super critical fluid greater than the amount of residual volatile material in the melt, typically not more than about 10 weight %, and passing the melt through a flash chamber devolatilizer at a pressure of 12 mm of Hg or less at a temperature of from 200° to 350° C.

23 Claims, No Drawings

DEVOLATILIZATION

FIELD OF THE INVENTION

The present invention relates to the devolatilization of melts of one or more polymers. More particularly the present invention relates to devolatilization of polymers of vinyl aromatic monomers or blends of polymers of vinyl aromatic monomers and polyphenylene oxide.

BACKGROUND OF THE INVENTION

U.S. Pat. No. 3,773,740, issued Nov. 20, 1973 in the name of T. T. Szabo, assigned to Union Carbide disclosed the devolatilization of polymers in a flash chamber. Typically the polymers are polymers containing at least one vinyl aromatic monomer. The patent teaches that from 0.50 to 2.75 weight % of water may be injected into a melt of the polymer. The pressure on the polymer melt is suddenly lowered to about 20 to 40 mm of Hg (Torr) (1 Torr is 1 mm of Hg or about $1.333 \times 10^2$ Pascals (Pa)). The water in the polymer melt is flashed to help remove residual vinyl aromatic monomers to about 0.30 weight % or about 3,000 parts per million (ppm). The process of the present invention does not contemplate the use of water and the content of residual monomer is lower that that taught by Szabo.

U.S. Pat. No. 4,195,169, issued Mar. 25, 1980, assigned to The Dow Chemical Company discloses devolatilizing polymers of styrene and acrylic acid or methacrylic acid by contacting the polymer melt with a compound of the formula ROH wherein R may be hydrogen or an alkyl radical. The devolatilization process does not increase the gel content in the resulting polymer (i.e. there are no insolubles in the resulting polymer). The process of the present invention does not contemplate the use of water.

Currently, the producers of polymers of vinyl aromatic monomers are seeking to produce polymers or blends of such polymers which contain less than about 200 ppm of monomers, oligomers and solvent. The Union Carbide patent does not teach one how to reduce monomer, oligomer and solvent levels to those required today. A simple approach might be to merely further reduce the pressure within the devolatilizer. However, at pressures of about 5 Torr and less, the water injected into the polymer will freeze in the condenser system between the devolatilizer and the vacuum source. Vapor pressure tables of water show that at pressures of less than 4.579 mm of Hg, water has to be cooled to less than 0° C. to condense. Accordingly, if the pressure in the condenser is less than about 5 mm Hg it is very difficult to keep the system operational.

U.S. Pat. No. 5,380,822 issued Jan. 10, 1995 to Skilbeck teaches a method to overcome the problem of potentially too low a pressure in the condenser in a styrene devolatilizer system. A gas is ejected into the vacuum line intermediate to the devolatilizer and the condenser to keep the condenser at a pressure above the pressure at which water would become solid (e.g. ice). However, Skilbeck still injects water into the styrene polymer.

Operating under very closely controlled procedures and by selecting lots of polymer from a particular batch, about the lowest levels of residual monomer that can be obtained are in the range of greater than 175 ppm, typically from 200 to 175 ppm.

U.S. Pat. No. 5,102,591, issued Apr. 7, 1992 discloses a process to devolatilize a polymer blend of styrene and polyphenylene oxide by passing the blend through an extrusion devolatilizer. That is an extruder equipped with vacuum ports. In such a process the polymer or polymer blend does not descend vertically through a flash chamber. Rather, the melt is passed horizontally in the barrel of an extruder beneath a vacuum port. Additionally, the reference teaches a two stage devolatilization. That is, first the polyphenylene oxide is devolatilized then the polystyrene is added to the polyphenylene oxide and the blend is then devolatilized.

U.S. Pat. No. 5,145,728 discloses reducing the residual monomer and oligomer content of polystyrene by blending with it a block copolymer of styrene and butadiene, typically such as those sold under the trademark K RESIN. The reference contemplates passing the polymer melt through a flash chamber devolatilizer, then extrusion blending the resulting polymer with the block copolymer. In the example at columns 4 and 5, the starting polymer is devolatilized using a screw extruder and water. Interestingly, the residual monomer and solvent level was not reduced below 150 ppm.

The process of the present invention has an advantage over the extrusion processes as there is a shorter history of shear under high temperature. Each time a polymer blend is passed through an extruder there is some degradation of polymer, particularly a reduction of molecular weight. Furthermore, extrusion processes are relatively expensive.

SUMMARY OF THE INVENTION

The present invention provides a process for reducing the amount of residual monomer, and solvent to less than 500, preferably less than 300, most preferably less than 200, desirably less than 150, parts per million in a polymer or polymer blend containing less than 5 weight % of such residual monomer, and solvent which process comprises:

(i) heating and maintaining said polymer or polymer blend as a melt at a temperature from 200°–270° C.;

(ii) injecting into said melt an amount of a non-oxidizing super critical fluid greater than the amount of residual monomer, and solvent but less than 10 weight %, said injection being at temperatures of from 200° to 270° C. and pressures to solubilize the super critical fluid in said melt; and (iii) maintaining said melt at a temperature from 200°–270° C. while exposing said melt to a pressure maintained at less than 12, preferably less than 8 Torr.

DETAILED DESCRIPTION

In the bulk or solution polymerization of a number of monomers containing one or more vinyl aromatic monomers, the monomers are fed to one or more reactors where they are polymerized to at least about 65% conversion. The polymer leaves the reactor, in the case of a tower process as illustrated by U.S. Pat. No. 3,658,946, issued Apr. 25, 1972, assigned to BASF and U.S. Pat. No. 3,660,535, issued May 2, 1972, assigned to the Dow Chemical Company, or the last reactor in the case of a Monsanto type process as illustrated by U.S. Pat. No. 3,903,202, issued Sep. 2, 1975, assigned to Monsanto, and travels through a preheater. The preheater heats the polymer melt to a temperature of from about 200° to 270° C. to increase the vapor pressure of the volatiles and reduce the viscosity of the melt to permit it to foam. An additional problem which the present invention minimizes is the cooling of the polymer melt due to the latent heat of vaporization of the volatiles as the melt travels through the devolatilizer as a super critical fluid does not require significant amounts of heat, if any, to vaporize.

The heated polymer melt is then exposed to a zone of low pressure. The zone of low pressure may be in the barrel of an extruder having one or more vacuum ports or a falling strand devolatilizer. If the zone of low pressure is a falling strand devolatilizer preferably it may comprise two or more, most preferably two stages. The devolatilizer vessel is operated at temperatures from 200° C. to 350° C., preferably from 210° C. to 255° C., most preferably from 225° to 235° C. Typically the pressure in the first stage of the devolatilizer will be from 10 to 45 Torr, preferably less than 20 Torr. The polymer melt descends from the preheater and is deposited on the bottom of the devolatilizer vessel. As the polymer melt exits the preheater and descends to the bottom of the devolatilizer vessel, volatiles within the melt are flashed off. The polymer melt at the bottom of the first stage of a two-stage devolatilizer should have a residual content of monomer, and solvent of less than 2, preferably less than 1, most preferably less than 0.5 weight %.

The melt is then collected and pumped to the second stage of the two-stage devolatilizer. Between the first and second stage of the devolatilizer is a fluid injection zone (containing an injection port for the super critical fluid).

The fluid injection port is operated at temperatures from 200° to 275° C., preferably at temperatures approximate those in the devolatilizer, and at pressures sufficient to keep the super critical fluid in a fluid state and dissolve the super critical fluid in the melt. The fluid injection pump is operated to provide typically less than 10, more typically less than 5, most typically less than 2, preferably less than 1, most preferably from 0.45 to 0.74 weight % of super critical fluid into the polymer melt. Generally, for the injection of super critical fluid to be useful in the reduction of volatile material in a polymer melt, the amount of super critical fluid injected into the melt should be greater than the amount of residual volatile materials in the melt. From a practical point of view, the amount of super critical fluid injected into the melt should be in accordance with the above teaching.

The super critical fluid may be any material (other than water) which would normally be gas under the conditions of injection but which is kept in solution due to the high pressures of injection. The super critical fluid may be selected from the group consisting of carbon dioxide, lower ($C_{4-6}$) alkanes (such as butane and pentane), and nitrogen. The injection pressure may range from 1,000 to 15,000 psig. Typical pressures of injection may be from 1,000 to 5,000, preferably from 1,500 to 3,500 psig for carbon dioxide and the lower alkanes. For nitrogen, higher pressures from about 5,000 up to about 15,000, preferably from 10,000 to 15,000 psig may be required. It is preferable that a single phase mixture (i.e. a solution of super critical fluid in the melt) is maintained rather than a two phase system to improve the mixing of the super critical fluid and the melt of polymer or polymer blend.

If the devolatilizer has a less than ideal preheater/distributor head, to maintain pressure or back pressure on the melt prior to entering into the flash chamber any type of restriction orifice or device such as a "shower head" (multi strand distributor head) may be employed (on the polymer melt inlet into the flash chamber or drum). This prevents foaming prior to entering the devolatilizer drum.

Henry's law may be used to calculate the amount of super critical fluid dissolved in the polymer melt:

$$P = x_w H \text{ or } x_w = P/H$$

wherein P is the system pressure, H is Henry's law gas constant at a specific temperature and $x_w$ is the weight fraction of super critical fluid dissolved in the polymer. For example, for $CO_2$, $H_{CO2}$ at 180° C. is 234 Mpa=33939 psia=2308 atm. If P is 2000 psig=2014.7 psia, then $w_x$=2014.7/33939=0.059 or about 5.9 weight % of $CO_2$ in the polymer melt.

Preferably the supercritical fluid injection zone contains a mixer such as a static mixer or a series of static mixers.

The solution of super critical fluid dissolved in the melt of polymer or polymer blend then passes through the second stage of the devolatilizer. The devolatilizer is operated at temperatures from 200° C. to 270° C., preferably from 210° C. to 255° C., most preferably from 225° C. to 235° C. The second stage of the devolatilizer should be operated so that the polymer melt is exposed to a pressure of less than 12, preferably less than 8, most preferably less than 5, desirably less than 3 Torr. The polymer melt foams as it enters the devolatilization vessel. The foam has a large surface area which improves mass transfer of the residual volatile species.

In a less than optimum designed devolatilizer, to increase the residence time of the polymer melt in the second stage of the devolatilizer, optionally one or more distributor trays may be installed inside the devolatilizer. However, a distributor tray is not essential to practice the present invention. To provide suitable residence times within the stages of the devolatilizer, a distributor tray may be installed inside the devolatilizer. Various distributor designs have been described in U.S. Pat. No. 4,934,433 issued Jun. 19, 1990, U.S. Pat. No. 5,069,750 issued Dec. 3, 1991, and U.S. Pat. No. 5,118,388 issued Jun. 2, 1992 all assigned to Polysar Financial Services S.A. now renamed Novacer Chemicals (International) S.A.

As the polymer descends through the bottom of the second, or last as the case may be, stage of the falling strand devolatilizer typically in the form of a strand, the super critical fluid in the polymer and residual monomer and solvent are flashed off. The melt is then pumped to a strand forming die and the strands typically pass through a cooling water bath into a rotary pelletizer.

The vapor from the super critical fluid and volatile monomer(s), solvent(s) and any additional non-condensable gases are withdrawn overhead from the devolatilizer. The condensable materials such as styrene monomer, dimers, trimers, and solvent, typically ethylbenzene, are condensed in a condenser upstream from the vacuum pump. The inert non-condensable gases such as $CO_2$ pass through the vacuum pump and are vented to the atmosphere. If lower alkanes are used they may be condensed and separated from styrene monomer and ethylbenzene and recycled or they may be passed to a flare stack and burned.

Downstream of the condenser is a vacuum source which should be of sufficient size so as to be capable of maintaining the vacuum throughout the devolatilizer and condenser system.

While the present invention has been described in terms of a devolatilizer it is equally applicable to vacuum extruders. Rather than being fed to a falling strand devolatilizer the polymer containing less than about 10, preferably less than 5, most preferably less than about 2 weight % of residual monomer and solvent is fed to an extruder. The polymer is subjected to shear at the above temperatures to melt the polymer. The super critical fluid injection means may be located in the extruder barrel upstream of vacuum ports. For example, the extruder could feed a static mixer or section of the extruder barrel and could have mixing elements such as pin mixers. The melt then passes by one or more ports at low pressure having a pressure of less than 12, preferably less than 8, most preferably less than 3 mm of Hg (or Torr). While passing these ports the super critical fluid flashes out of the polymer melt, creating a foam which facilitates the removal of the residual monomer and solvent.

Typically the polymer melt is a melt of one or more polymers selected from the group of polymers including polystyrene, high impact polystyrene (HIPS), styrene acrylonitrile polymers (SAN), acrylonitrile butadiene styrene polymers (ABS), styrene methyl methacrylate polymers, styrene maleic anhydride polymers (SMA), and butadiene styrene methyl methacrylate polymers (MBS), and one or more of the aforesaid polymers, most preferably high impact polystyrene blended with polyphenylene oxide. However, the process of the present invention could be used in association with other polymers such as polyamides (e.g. nylons) and aromatic polyesters such as polyethylene terephthalate and polybutylene terephthalate.

Generally, the polymers which may be treated in accordance with the present invention comprise:
(i) from 100 to 30, preferably from 100 to 50, most preferably from 100 to 70 weight % of one or more monomers selected from the group consisting of $C_{8-12}$ vinyl aromatic monomers which are unsubstituted or substituted by a $C_{1-4}$ alkyl radical; and
(ii) from 0 to 70, preferably 0 to 50, most preferably from 0 to 30 weight % of one more monomers selected from the group consisting of $C_{1-4}$ alkyl esters of acrylic or methacrylic acid; acrylonitrile and methacrylonitrile; and in the case of the most preferred range maleic anhydride (i.e. SMA polymers typically comprise from 5 to 25, preferably from 5 to 15 weight % of maleic anhydride and the balance one or more of the above vinyl aromatic monomers, most preferably styrene);
which polymers may be grafted on to from 0 to 40, preferably from 0 to 20 weight % of one or more rubbery polymers selected from the group consisting of one or more $C_{4-6}$ conjugated diolefin monomers and polymers comprising from 20 to 80, preferably from 40 to 60, weight % of one or more $C_{8-12}$ vinyl aromatic monomers and from 80 to 20, preferably from 60 to 40 weight % of one or more $C_{4-6}$ conjugated diolefins.

Suitable vinyl aromatic monomers include styrene, alpha-methyl styrene, and p-methyl styrene. Suitable esters of acrylic or methacrylic acid include methyl methacrylate, ethyl methacrylate, methyl acrylate, ethyl acrylate, and butyl acrylate. Suitable conjugated diolefin monomers include butadiene and isoprene. Most preferably the polymer melt is polystyrene or high impact polystyrene (HIPS).

The present invention has been described in terms of the devolatilization of a polymer melt of polystyrene. However, the present invention may also be used in association with melts of other polymers such as acrylonitrile butadiene styrene polymers (ABS), styrene acrylonitrile polymers (SAN), styrene maleic anhydride (SMA) and polymer blends. The present invention is particularly useful where polymers are solution blended. That is, miscible solutions of two polymers are mixed and the solvent(s) is/are removed. In such cases, it is often desirable to remove the solvent(s) to as low a level as possible.

One commercially available blend in which the present invention may be useful is a blend of polyphenylene oxide (trademark) and polystyrene or a blend of polyphenylene oxide and high impact polystyrene. Typically, the weight ratio of polystyrene to polyphenylene oxide is from 90:10 to 10:90, preferably from 70:30 to 10:90.

In a particularly preferred embodiment of the present invention a nucleating agent may be added to the polymer or polymer blend melt prior to injection of the super critical fluid. The nucleating agent may be an inert material such as talc or it may give rise to a fine foam per se such as that created by the use of carboxylic acids, preferably citric acid and/or sodium bicarbonate. These agents may be added to the last reactor prior to the polymer or polymer blend melt being fed to the pre heater. Without wishing to be bound by theory it is believed that the use of a nucleating agent gives rise to a more uniform distribution of foam cells of a finer size thus providing for an even larger surface area of the foam. The nucleating agents may be added in small amounts from about 1,000 to about 2,500, preferably from about 1,300 to about 1,800, most preferably about 1,500 parts per million (ppm).

Other conventional agents such as heat and light stabilizers (both primary, such as hindered phenolic compounds, and secondary, such as phosphates, phosphites and phosphonites), UV stabilizers, and processing aids such as lubricants (e.g. alkaline or alkaline earth salts of long chain fatty acids such as stearic acid) may also be included in the melt. Typically, these additives are present in amounts of less than about 5, preferably less than about 2, most preferably less than about 1 weight in total.

Other applications of the present invention will be apparent to those skilled in the art.

The present invention will now be illustrated by the following examples in which, unless otherwise specified, parts is parts by weight (i.e. grams) and % is weight %.

SAMPLE PREPARATION

Samples of a specially prepared crystal polystyrene which contained 2,000 ppm of residual styrene monomer were used in Example 1. Pellets of the crystal polystyrene feed were passed through an extruder to melt the polymer. The extruder was operated at 75 RPM and had 4 zones at 360°, 380°, 395°, and 410° C. The extruder fed a laboratory falling strand devolatilizer (e.g. Flash tank). Between the extruder and the flash tank was an injection port and various amounts of $CO_2$ were injected into the melt. The melt was pumped into the devolatilizer and the $CO_2$ foamed out of the melt together with entrained monomer and solvent (ethylbenzene). The polymer coming out of the devolatilizer was analyzed for residual monomer and ethylbenzene. The conditions and results of the experiments are set forth in Table 1.

TABLE 1

| $CO_2$ Injection (g/min.) | Pressure at Injection Port (psia) | Weight % $CO_2$ in Melt | Pressure in Devolatilizer (Torr) | Residual Styrene Monomer (ppm) |
|---|---|---|---|---|
| nil | 2580 | 0.0 | 760 | 2117 |
| nil | 2600 | 0.0 | 2.5 | 632 |
| 2.4 | 2510 | 0.79 | 4.5 | 310 |
| 2.58 | 2510 | 0.85 | 4.75 | 264 |
| 3.0 | 2500 | 0.99 | 4.3 | 226 |

These results show that residual monomer and solvent may be reduced to less than 300 ppm using the present invention without a back pressure maintenance device.

EXAMPLE 2

Further runs were carried out in the same manner as Example 1 except that the level of residual styrene monomer in the feed was lowered to 1,000 ppm. The conditions and the results of the runs are set forth in Table 2.

TABLE 2

| $CO_2$ Injection (g/min.) | Pressure at Injection Port (psia) | Weight % $CO_2$ in Melt | Pressure in Devolatilizer (Torr) | Residual Styrene Monomer (ppm) |
|---|---|---|---|---|
| nil | — | 0.0 | 760 | 1031 |
| nil | 2740 | 0.0. | 2.5 | 368 |
| 3.2 | 2600 | 1.1 | 6.5 | 238 |
| 4.6 | 2600 | 1.5 | 6.5 | 289 |
| 4.6 | — | 1.5 | 6.5 | 304 |

The experiments show that at higher levels of vacuum better results are obtained. If the devolatilization can be carried out at pressures below about 8 Torr, excellent results can be obtained.

What is claimed is:

1. A process for reducing the amount of residual monomer, and solvent to less than 300 parts per million in a polymer or polymer blend containing less than 5 weight % of such residual monomer, and solvent which process comprises:

(i) heating and maintaining said polymer or polymer blend as a melt at a temperature from 200°–270° C.;

(ii) injecting into said melt an amount of a non-oxidizing super critical fluid greater than the amount of residual monomer, and solvent but less than 5 weight %, said injection being at temperatures of from 200° to 270° C. and pressures to dissolve the super critical fluid in said melt; and (iii) maintaining said melt at a temperature from 200°–270° C. while exposing said polymer to a pressure maintained at less than 8 Torr.

2. The process according to claim 1 wherein said polymer or polymer blend contains less than 2% of residual monomer and solvent.

3. The process according to claim 2 wherein said super critical fluid is injected into said polymer or polymer blend at a pressure from 1,000 to 15,000 psig.

4. The process according to claim 3 wherein said super critical fluid is selected from the group consisting of $CO_2$, $C_{4-6}$ alkanes and nitrogen.

5. The process according to claim 4, wherein said polymer or polymer blend is selected from the group consisting of:

(A) polymers comprising:
     (i) from 100 to 30 weight % of one or more monomers selected from the group consisting of $C_{8-12}$ vinyl aromatic monomers which are unsubstituted or substituted by a $C_{1-4}$ alkyl radical; and
     (ii) from 0 to 70 weight % of one or more monomers selected from the group consisting of $C_{1-4}$ alkyl esters of acrylic or methacrylic acid, acrylonitrile and methacrylonitrile;

which polymers may be grafted on to from 0 to 40 weigh % of one or more rubbery polymers selected from the group consisting of:
     (iii) polymers consisting essentially of one or more $C_{4-6}$ conjugated diolefin monomers; and
     (iv) polymers consisting essentially of from 20 to 80 weight % of one or more $C_{8-12}$ vinyl aromatic monomers and from 80 to 20 weight % of one or more $C_{4-6}$ conjugated diolefins;

(B) polymers comprising:
     (i) from 95 to 85 weight % of one or more $C_{8-12}$ vinyl aromatic monomers; and
     (ii) from 15 to 5 weight % of maleic anhydride;

(C) a blend of said polymers and polyphenylene oxide;

(D) polyamides; and (E) aromatic polyesters.

6. The process according to claim 5 wherein said polymer or polymer melt is maintained at a temperature from 225° to 235° C.

7. The process according to claim 6 wherein said super critical fluid is nitrogen and is injected at pressures from 10,000 to 15,000 psig.

8. The process according to claim 6, wherein said super critical fluid is $CO_2$ and is injected at pressures from 1,000 to 5,000 psig.

9. The process according to claim 7, wherein said melt is passed through an extruder having vacuum ports.

10. The process according to claim 9, wherein said pressure is less than 5 Torr.

11. The process according to claim 8, wherein said melt is passed through an extruder having vacuum ports.

12. The process according to claim 11, wherein said pressure is less than 5 Torr.

13. The process according to claim 7, wherein said melt is passed through a flash chamber.

14. The process according to claim 13, wherein the pressure is less than 5 Torr.

15. The process according to claim 8, wherein said melt is passed through a flash chamber.

16. The process according to claim 15, wherein said pressure is less than 5 Torr.

17. The process according to claim 10, further including adding to said melt from 1,000 to 2,500 parts per million of a nucleating agent.

18. The process according to claim 12, further including adding to said melt from 1,000 to 2,500 parts per million of a nucleating agent.

19. The process according to claim 14, further including adding to said melt from 1,000 to 2,500 parts per million of a nucleating agent.

20. The process according to claim 16, further including adding to said melt from 1,000 to 2,500 parts per million of a nucleating agent.

21. The process according to claim 16 further comprising depositing said polymer or polymer blend on one or more distributor trays within said flash chamber.

22. The process according to claim 16 wherein the inlet line into said flash chamber has a pressure restriction device or head.

23. The process according to claim 16 wherein said polymer or polymer blend is selected from the group consisting of polystyrene, HIPS, SAN, ABS, SMA and copolymers of styrene and methyl methacrylate.

* * * * *